United States Patent [19]
Fishaw

[11] Patent Number: 5,881,862
[45] Date of Patent: Mar. 16, 1999

[54] TORQUE LIMITING ROLLER DRIVE FOR CONVEYORS

[75] Inventor: R. Thomas Fishaw, Plymouth, Mich.

[73] Assignee: Ingersoll-Rand Company, Woodcliff Lake, N.J.

[21] Appl. No.: 739,348

[22] Filed: Oct. 29, 1996

[51] Int. Cl.[6] .................................................. B65G 13/071
[52] U.S. Cl. .................. 198/781.02; 198/781.04
[58] Field of Search ........................... 198/781.02, 781.04

[56] References Cited

U.S. PATENT DOCUMENTS

| | | | |
|---|---|---|---|
| 3,610,406 | 10/1971 | Fleischauer et al. | 198/781.04 |
| 3,942,338 | 3/1976 | Furlette et al. | 64/30 D |
| 4,006,816 | 2/1977 | Werntz | 198/781.04 |
| 4,056,953 | 11/1977 | Furlette et al. | 64/30 D |
| 4,263,789 | 4/1981 | Koepke et al. | 64/30 D |
| 4,542,861 | 9/1985 | Matshushita | 198/781.04 |
| 4,993,541 | 2/1991 | Roh | 198/781.02 |

*Primary Examiner*—William E. Terrell
*Assistant Examiner*—Mark Deuble
*Attorney, Agent, or Firm*—Walter C. Vliet; Leon Nigohosian, Jr.

[57] ABSTRACT

In a power driven roller conveyor having a plurality of rollers mounted on a driven shaft for supporting and transporting a work piece with a limiting drive force. The drive shaft is provided with concentrically disposed spacers, rollers, and bearings which are compressed between an end driving sprocket and an adjustable spring pressure plate on an opposite end and wherein adjustment of the axial compressor force produced by the end mounted spring pressure plate serves to vary the release torque of the individual rollers mounted on the shaft.

5 Claims, 1 Drawing Sheet

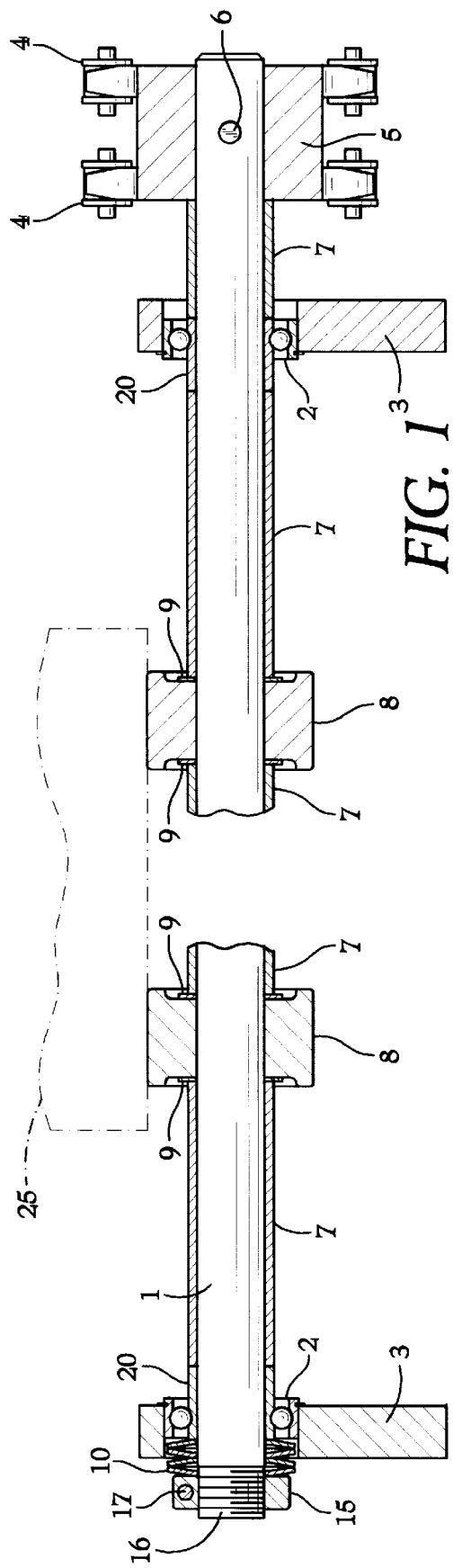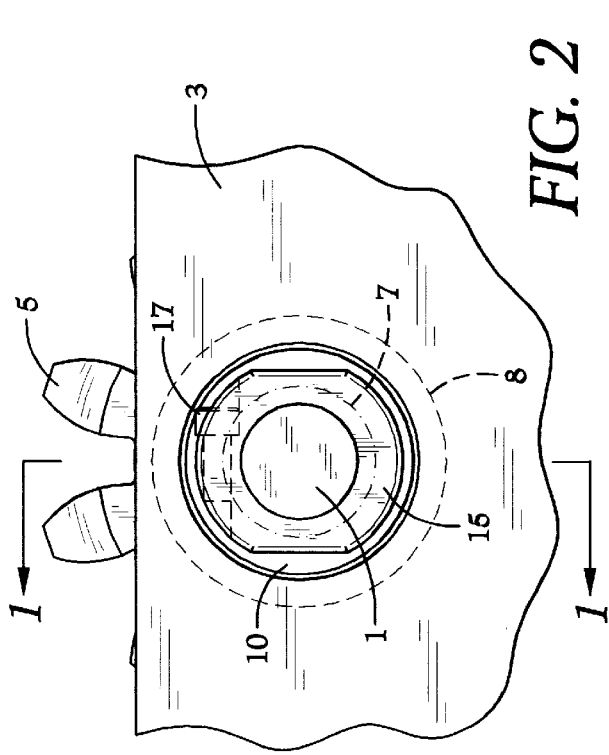

TORQUE LIMITING ROLLER DRIVE FOR CONVEYORS

BACKGROUND OF THE INVENTION

This invention relates generally to conveyors and more particularly to power driven roller conveyors wherein the roll driving force is selectable to permit stopping of a work piece on the conveyor without undue roller drive damage to the work piece or to the driving mechanism. In the prior art, as evidenced by U.S. Pat. No. 4,263,789, entitled "Torque Responsive Drive Coupling for Roller Conveyors", such couplings were relatively complex and did not permit the use or spacing of multiple individual work support rollers on a single driven shaft.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention this is accomplished by providing a torque limiting roller drive for a conveyor driven roller comprising a shaft driven in rotation by a drive means at one end; selected alternative spacers and rollers disposed in end to end stacking relationship on the shaft for rotation about and selectively therewith the shaft; and means on an opposite end of the shaft compressing the spacers and the rollers in the end to end stacking relationship to effect a selected drive force between the shaft and the rollers.

The foregoing and other aspects will become apparent from the following detailed description of the invention when considered in conjunction with the accompanying drawing figures.

BRIEF DESCRIPTION OF THE DRAWING FIGURES

FIG. 1 is a cross sectional view taken at section 1—1 of FIG. 2 of a torque limiting roller drive for a conveyor according to the present invention; and FIG. 2 is an end view of the torque limiting roller drive according to FIG. 1 showing the end view details of the roller and the pressure plate adjusting collar.

DETAILED DESCRIPTION

According to the present invention a roller conveyor shaft 1 is shown mounted for rotation in a pair of ball bearings 2 which are in turn mounted for support on a conveyor frame 3. The shaft is shown driven by a roller chain 4 through a sprocket 5 which is pinned to the shaft by means of a roll pin 6. Concentrically mounted about the shaft are a selected number of spacers 7 and conveyor rollers 8 (two of which are shown). A thrust or friction washer 9 is shown interspaced between each spacer 7 and each roller 8. The rollers 8 are free to rotate and translate axially along the shaft 1 and are restrained from such axial displacement by means of the spacers 7. The spacers 7 are in turn free to translate along the shaft 1. As shown, the spacers are also free to rotate about the shaft 1. However, it is also possible to accomplish the present invention by limiting the free rotation of the spacers 7 about the shaft 1. The inner race 20 of the bearing 2 is also free to permit limited axial displacement along the shaft 1, while the bearing in turn retains the radial alignment of the shaft in rotation. A work piece 25 is shown supported on the rollers 8 for selective force transfer along the conveyor.

As shown in FIG. 1, according to the present invention a spring pressure plate 10 is shown disposed on the shaft 1 and is shown interspaced between the inner race 20 of the left hand bearing 2 and a threaded clamp type collar 15 which is internally threaded and cooperates with an adjusting threaded portion of shaft 1. In operation, according to the present invention, the threaded clamp type collar is loosened and rotated in a direction advancing to the right, as seen in FIG. 1, along thread 16. This in turn compresses the spring pressure plate 10 to a point in which a desired axial thrust is imparted to the stacked spacers 7, rollers 8, and inner races 20 of the bearings 2 which are now compressed between the spring pressure plate and the roller chain sprocket 5.

The resulting compression force acting on the rollers 8 through the thrust or friction washers 9 determine the amount of drive force that the shaft 1 is capable of transmitting to the rollers 8. Increasing the compression by advancing the threaded clamp type collar 15 to the right, as shown in FIG. 1, an increase in the amount of roller drive is accomplished. Conversely, rotating the collar to retract to the left decreases the roller drive. Once the desired roller drive force is achieved by rotary adjustment of the collar 15, the collar may be locked in place by means of lock screw 17. The resulting structure is both economical to manufacture and provides flexibility in selection of roller spacing, numbers of rollers, along with the economy of standardized parts.

Further, since the individual drive of each roller is dependent on a uniform stacked force derived from compression of a single pressure plate, a more uniform driving force is achieved in each of the separate rolls.

Having described my invention in terms of a preferred embodiment, I do not wish to be limited in the scope of my invention as numerous variations will occur to one skilled in the art except as claimed.

What is claimed is:

1. A torque limiting roller drive for a conveyor driven roller comprising:

a shaft driven in rotation by a drive means at one end;

selected alternative spacers and rollers disposed in end to end stacking relationship on said shaft for rotation about and selectively therewith said shaft, said shaft being mounted on bearings forming a subgroup of said spacers and said bearings being further provided with an inner race permitting limited axial displacement relative to said shaft; and means on an opposite end of said shaft compressing said spacers and said rollers in said end to end stacking relationship to effect a selected drive force between said shaft and said rollers.

2. A torque limiting roller drive for a conveyor driven roller according to claim 1 wherein:

said rollers are work support transfer rollers.

3. A torque limiting roller drive for a conveyor driven roller according to claim 1 wherein:

said means for compressing said spacers and said rollers comprises a pressure plate spring interspaced between a shaft mounted adjusting nut and said selected alternative spacers and rollers.

4. A torque limiting roller drive for a conveyor driven roller according to claim 1 wherein:

said shaft is provided with a drive means further comprising a chain sprocket.

5. A torque limiting roller drive for a conveyor driven roller according to claim 4 wherein:

said chain sprocket further limits axial displacement of said rollers and said spacers along said shaft to effect compression therebetween said chain sprocket and said means for compressing said spacers and said rollers.

* * * * *